United States Patent [19]

Hess et al.

[11] 4,163,093

[45] Jul. 31, 1979

[54] PROCESS FOR THE PRODUCTION OF POLYESTERS FOR AIR-DRYING UNSATURATED POLYESTER RESINS

[75] Inventors: Bernhard Hess, Moers; Klaus Kraft, Muelheim, both of Fed. Rep. of Germany

[73] Assignee: Bayer Aktiengesellschaft, Fed. Rep. of Germany

[21] Appl. No.: 839,575

[22] Filed: Oct. 5, 1977

[30] Foreign Application Priority Data

Oct. 9, 1976 [DE] Fed. Rep. of Germany ....... 2645657

[51] Int. Cl.² ............................................. C08L 67/06

[52] U.S. Cl. .................................... 528/301; 528/306
[58] Field of Search .................................. 260/75 UA

[56] References Cited

FOREIGN PATENT DOCUMENTS 869298  5/1961  United Kingdom ............... 260/75 UA

*Primary Examiner*—M. J. Welsh
*Attorney, Agent, or Firm*—Connolly and Hutz

[57] ABSTRACT

Highly reactive unsaturated polyesters for air-drying polyester resins can be obtained by reacting $\beta,\gamma$-ethylenically unsaturated ether alcohols with a polyester precondensate.

2 Claims, No Drawings

PROCESS FOR THE PRODUCTION OF POLYESTERS FOR AIR-DRYING UNSATURATED POLYESTER RESINS

This invention relates to the production of $\alpha,\beta$-ethylenically unsaturated polyesters which are suitable as a basis for air-drying unsaturated polyester resins by a special type of melt condensation process.

Air-drying unsaturated polyester resins are known (German Auslegeschrift No. 1,129,688, German Auslegeschrift No. 1,494,010, German Patent Specification No. 1,494,437, German Offenlegungsschrift No. 1,956,284). Resins of this type are polyester resins of which the polyesters, in addition to $\alpha,\beta$-ethylenically unsaturated dicarboxylic acids and dihydric alcohols, contain $\beta,\gamma$-ethylenically unsaturated ether groups in co-condensed form, for example through glycidyl allyl ether or trimethylol propane diallyl ether. According to German Auslegeschrift No. 1,494,437, these polyesters may be produced by the melt condensation or azeotropic process at temperatures in the range from 140° C. to 200° C.

It is known from J. Scheibers "Chemie und Technologie der künstlichen Harze," Vol. 1, Wissenschaft 1. Verlagsgesellschaft mbH, Stuttgart 1961, page 568, that it is advantageous to carry out esterification reactions in an acidic medium, so that it is advisable initially to retain a small proportion of the dihydric alcohol for addition towards the end of the operations.

The cycle times of lacquering installations are directly determined by the drying time of the lacquers used, i.e. by the reactivity of the lacquer binders. There is a need to increase the reactivity of air-drying binders and hence further to shorten the cycle times without, of course, adversely affecting the hardness of the hardened coatings, and in this way to increase throughput in the lacquering shop.

It is now surprisingly been found that air-drying unsaturated polyester resins with comparatively greater reactivity can be formed by initially producing a polyester condensate which contains carboxyl groups and is free from $\beta,\gamma$-ethylenically unsaturated ether groups, and subsequently reacting it with $\beta,\gamma$-ethylenically unsaturated ether alcohol.

Thus, the present invention provides a process for the production of polyesters for air-drying unsaturated polyester resins from (a) $\alpha,\beta$-ethylenically unsaturated dicarboxylic acids or their anhydrides;
(b) dihydric alcohols which are free from $\beta,\gamma$-ethylenically unsaturated ether groups;
(c) $\beta,\gamma$-ethylenically unsaturated ether alcohols; and optionally
(d) aromatic, alicyclic or saturated aliphatic dicarboxylic acids or their anhydrides;
(e) monocarboxylic acids; and
(f) monohydric, trihydric or tetrahydric alcohols, wherein components, a, b and, optionally, d, e, f are initially reacted in the absence of oxygen at 140° C. to 220° C. and preferably at 180° C. to 210° C. to form a polyester precondensate with an acid number above 70, preferably above 80, and with a hydroxyl number (as determined by acetylation) below 40, preferably below 30, and subsequently co-condensing component (c) with the resulting precondensate at 140° C. to 200° C. and preferably at 140° C. to 180° C.

Since the reactivity of the polyesters according to the invention is determined by the number of $\beta,\gamma$-ethylenically unsaturated ether groups per unit by weight by polyester, maximum reactivity can be obtained by incorporating the corresponding monohydric ether-alcohols containing at least two $\beta,\gamma$-ethylenically unsaturated ether units. The present invention also relates to the polyesters produced by this process. It is advisable to continue esterification in a first reaction step until there is no further significant reduction in the acid number. The molar ratios in which the individual components are used for the first step should be selected so that an acid number above 70, preferably above 80, and a hydroxyl number below 40, preferably below 30, are obtained on completion of this reaction step.

In addition, it is advantageous in cases where maleic acid or maleic acid anhydride is used not to terminate the first step of the reaction until almost 100% of the maleate has been rearranged into fumarate in order thus to ensure that a highly reactive end product is obtained.

The quantity of $\beta,\gamma$-ethylenically unsaturated ether alcohol used in the second step of the reaction may vary within wide limits because the ether alcohol is incorporated into the polyester molecule not only by esterification of its hydroxyl groups, but also by other reactions which have not yet been completely elucidated (cf. German Patent Specification No. 1,494,437). The ether alcohol may readily be used in three times the equivalent quantity, based on the acid number of the acid precondensate. In order to avoid an uncontrollably drastic increase in viscosity (with consequent danger of gelation) towards the end of the condensation reaction, it is best to complete the condensation reaction at a temperature which is reduced in stages. In this way, the reaction velocity can be reduced as required so that both the acid number and the viscosity can be more effectively monitored.

The polyester end product should contain at least 0.1 mole of $\beta,\gamma$-ethylenically unsaturated ether groups and 0.2 mole of $\alpha,\beta$-ethylenically unsaturated dicarboxylate groups per 100 g of unsaturated polyester.

Air-drying polyester resins based on the unsaturated polyesters produced in accordance with the invention are characterised by particular advantages. Compared with resins based on polyesters produced in a single step, they show a considerably shorter drying time at room temperature. Coatings produced from polyester resins such as these are considerably harder than lacquer coatings of conventional air-drying polyester resins. These findings are all the more surprising insofar as it is not possible to produce useable air-drying polyesters by a similar two-stage melt condensation process, namely forming a precondensate of $\alpha,\beta$-ethylenically unsaturated dicarboxylic acid or its anhydride and $\beta,\gamma$-ethylenically unsaturated ether alcohol and subsequently esterifying this precondensate with dihydric alcohol. Either the precondensate gels prematurely or esterification has to be carried out so carefully at extremely low temperatures that extremely long esterification times are necessary, resulting in poor volume/time yields and in the formation of products of poor quality.

Component (a) may consist of $\alpha,\beta$-ethylenically unsaturated dicarboxylic acids generally containing 4 or 5 carbon atoms or their anhydrides, for example maleic acid or maleic acid anhydride and fumaric acid. However, it is also possible to use, for example, mesaconic acid, citraconic acid, itaconic acid or chloromaleic acid.

Component (b) may consist of dihydric alcohols generally containing from 2 to 8 carbon atoms. Suitable dihydric alcohols are ethylene glycol, 1,2-propane diol, 1,3-propane diol, diethylene glycol, dipropylene glycol, tri- and tetra-ethylene glycol, 1,3-butane diol, 1,4-butane diol, neopentyl glycol, 1,6-hexane diol, bis-alkoxylated bisphenol A, perhydrobisphenol and others. It is preferred to use ethylene glycol, 1,2-propane diol 1,3-butane diol, diethylene glycol, dipropylene glycol and neopentyl glycol.

In addition to at least one esterifiable hydroxyl group, the $\beta,\gamma$-ethylenically unsaturated ether alcohols(c) also contain at least one and preferably at least two $\beta,\gamma$-ethylenically unsaturated ether radicals corresponding to the formula:

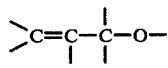

Suitable ether alcohols (c), which generally contain from 6 to 20 carbon atoms, are for example allyl, methallyl, ethallyl, chlorallyl, crotyl, methyl vinyl carbinol or butene-2,3-diol-1,4-ethers, such as ethoxylated or propoxylated allyl, methallyl, ethallyl or chlorallyl alcohol, glycerol mono- or di-allyl ether, trimethylol ethane mono- or di-methallyl ether, trimethylol propane mono- or di-allyl ether, 1,3,5-hexane triol mono- or di-chlorallyl ether, 3,3-dimethylol-butanol-2-mono- or di-crotyl ether, pentaerythritol mono-, di- or tri-allyl ether, trimethylol propane methyl vinyl carbinyl ether, butene-2,3-diol-1,4-mono- or di-oxyethyl ether, tetramethylol cyclohexanol tetraallyl ether, butene-2,3-diol-1,4-monoallyl ether, mixed ethers such as trimethylol propane monoallyl monocrotyl ether and pentaerythritol mono- or di-allyl monobenzyl ether.

Component (d) may be an aromatic and cycloaliphatic dicarboxylic acids generally containing from 8 to 10 carbon atoms, or of aliphatic saturated dicarboxylic acids generally containing from 4 to 10 carbon atoms or their anhydrides.

Examples of the aromatic, cycloaliphatic and aliphatic saturated dicarboxylic acids or their derivatives which may be used as component (d) in accordance with the invention are phthalic acid or phthalic acid anhydride, isophthalic acid, terephthalic acid, hexa- or tetra-hydrophthalic acid or their anhydrides, endomethylene tetrahydrophthalic acid or its anhydride, succinic acid or succinic acid anhydride and succinic acid esters and chlorides, glutaric acid, adipic acid, sebacic acid. In order to produce substantially non-inflammable resins, it is possible to use, for example, hexachloroendomethylene tetrahydrophthalic acid (HET acid), tetrachlorophthalic acid or tetrabromophthalic acid. The adducts of maleic acid with dicyclopentadiene or terpenes are also suitable for use as component (d).

Further modifications are possible by the incorporation of up to 10 mole %, based on the alcohol or acid component, of monohydric, trihydric and tetrahydric alcohols (f) containing from 1 to 6 carbon atoms, such as methanol, ethanol, butanol, isooctanol, allyl alcohol, benzyl alcohol, cyclohexanol and tetrahydrofurfuryl alcohol, trimethylol propane, glycerol and pentaerythritol, and monocarboxylic acids (e) such as benzoic acid, acrylic acid or methacrylic acid.

The molecular weights $\overline{M}_n$ of the air-drying polyesters, measured as a numerical average, are usually between about 500 and 5000 and preferably between about 1000 and 3000 (as measured by vapour pressure osmometry in dioxane and acetone; in the case of differing values, the lower value is taken as the correct value).

In order to protect the polyester resins against undesirable premature polymerization, it is advisable to add during their actual production from 0.001 to 0.1 part by weight of polymerisation inhibitors or antioxidants, based on 100 parts by weight of mixture of unsaturated polyester and copolymerisable monomers. Suitable auxiliaries of this type are, for example, phenols or phenol derivatives, preferably sterically hindered phenols which contain alkyl substituents with 1 to 6 carbon atoms in both positions ortho to the phenolic, hydroxy group, amines, preferably secondary arylamines and their derivatives, quinones, copper salts of organic acids, addition compounds of copper(I)halides with phosphites, for example, 4,4'-bis-(2,6-di-tert.-butylphenol), 1,3,5-trimethyl-2,4,6-tris-(3,5-di-tert.-butyl-4-hydroxybenzyl)-benzene, 4,4'-butylidene-bis-(6-tert.-butyl-m-cresol), 3,5-di-tert.-butyl-4-hydroxybenzyl phosphonic acid diethyl ester, N,N'-bis-($\beta$-naphthyl)-p-phenylene diamine, N,N'-bis-(1-methylheptyl)-p-phenylene diamine, phenyl-$\beta$-naphthylamine, 4,4'-bis-($\alpha,\alpha$-dimethylbenzyl)-diphenylamine, 1,3,5-tris-(3,5-di-tert.-butyl-4-hydroxyhydrocinnamoyl)-hexahydro-s-triazine, hydroquinone, p-benzoquinone, toluhydroquinone, trimethyl hydroquinone, 3,5-di-tert.-butyl hydroquinone, 2,6-di-tert.-butyl hydroquinone, 3,5-dibutyl quinone, p-tert.-butyl pyrocatechol, chloranil, bromanil, naphthoquinone, copper naphthenate, copper octoate, Cu(I)Cl/triphenyl phosphite, Cu(I)Cl/trimethyl phosphite, Cu(I)Cl/trischloroethyl phosphite, Cu-(I)Cl/tripropyl phosphite, p-nitrosodimethyl aniline. Other suitable stabilisers are described in "Methoden der organischen Chemie" (Houben-Weyl), 4th Edition, Vol. XIV/1, pages 433–452, 756, Georg Thieme-Verlag Stuttgart, 1961.

The resins produced on the basis of the polyesters according to the invention generally show the known air-drying properties of the unsaturated polyester resins containing $\beta,\gamma$-unsaturated ether radicals and may therefore be used for producing air-drying lacquers by dissolution in inert solvents and optionally adding the usual drying agents. However, they may also be copolymerised with radically polymerisable vinyl and vinylidene monomers to form homogeneous, insoluble and infusible plastics.

Copolymerisable vinyl and vinylidene compounds which are suitable for use in the present invention include the unsaturated compounds commonly encountered in polyester technology which preferably contain $\alpha$-substituted vinyl groups or $\beta$-substituted allyl groups, preferably styrene, although it is also possible to use, for example, nucleus-chlorinated and nucleus-alkylated or nucleus-alkenylated styrenes, in which case the alkyl groups may contain from 1 to 4 carbon atoms, for example vinyl toluene, divinyl benzene, $\alpha$-methyl styrene, tert.-butyl styrene, chlorostyrenes; vinyl esters of carboxylic acids with 2 to 6 carbon atoms; preferably vinyl acetate; vinyl pyridine, vinyl naphthalene, vinyl cyclohexane, acrylic acid and methacrylic acid and/or their esters (preferably vinyl, allyl and methallyl esters) with 1 to 4 carbon atoms in the alcohol component, their amides and nitriles, maleic acid anhydride, its semiesters and diesters with 1 to 4 carbon atoms in the alcohol component, semi-amides and diamides or cyclic imides such as N-methyl maleic imide or N-cyclohexyl maleic imide; allyl compounds such as allyl benzene and allyl esters such as allyl acetate, phthalic acid diallyl ester, isophthalic acid diallyl ester, fumaric acid diallyl ester, allyl carbonates, diallyl carbonates, triallyl phosphate and triallyl cyanurate.

The polyester resins generally contain from 30 to 80 parts by weight of polyester and from 70 to 20 parts by weight of copolymerisable vinyl or vinylidene compounds.

The copolymerisation reaction may be initiated by known methods, for example by irradiation with electron beams in the absence of further additives; after the addition of photoinitiators for example, benzoin or its ethers and those described in German Offenlegungsschrift No. 2,429,527, by irradiation with UV-light; after the addition of peroxides by heating to the decomposition temperature of the peroxide; after the addition of peroxides by adding accelerators, for example, cobalt, vanadium, manganese or iron salts or aromatic amines at room temperature.

The copolymers are hard and insoluble even on those surfaces which are in contact with air and even when hardening is carried out after appropriate catalysis at room temperature. Accordingly, these solutions of the unsaturated polyesters according to the invention in radically copolymerisable vinyl or vinylidene monomers are particularly suitable for the production of lacquer coatings and surfacing compositions which dry at the surface and, irrespective of the layer thickness, even in the form of relatively deep layers.

This quality advantage is all the more surprising insofar as the unsaturated polyesters produced by the two-stage condensation process according to the invention show the above-mentioned advantages over those produced in a single stage both on a maleic acid anhydride basis and on a fumaric acid basis. In other words the advantageous properties are afforded by the two-stage condensation process and not solely by using as high a fumarate content as possible in the unsaturated polyester which is produced by as quantitative as possible a rearrangement of maleate into fumarate or is directly obtained by the use of fumaric acid.

Cellulose esters, for example, cellulose acetates, propionates, butyrates or their mixed esters may also be added to the lacquer solutions according to the present invention for improving surface smoothness or for shortening the drying time. It is also possible to add thixotropic agents and smoothing agents, pigments and fillers of the usual type.

In addition, the polyester resins according to the present invention may be processed either on their own or in admixture with radically polymerisable vinyl monomers and optionally together with fillers and fibres to form surfacing compositions, cast resins or moulding compositions which can be hardened by the usual methods. Generally known shrinkage-reducing additives, also known as low-profile additives, such as thermoplastic polymers, polycondensates or polyaddition compounds, may also be added to the compositions in order to reduce the shrinkage which normally occurs during hardening.

The invention is illustrated by the following Examples, comparison being made with the included Comparison Examples.

EXAMPLES

The parts quoted in the following are parts by weight, whilst percentages represent percent by weight. The viscosity measurements were carried out on 60% solutions in styrene stabilised with 0.1% of tert.-butyl pyrocatechol in accordance with 4 DIN 53 211. In all the Examples and Comparison Examples, air is prevented from entering during the esterification process by passing a stream of nitrogen through the reaction mixture. The esterification reaction is carried out by the melt condensation process in a vessel equipped with a stirrer and a descending condenser.

A. Two-stage esterification process (according to the invention)

After the esterification components required for the first stage have been weighed in, the air is replaced with nitrogen and the components were quickly heated while stirring to 150° C., after which the temperature was increased to 210° C. over a period of 2 hours. After 3 hours at 210° C., there was no further reduction in the acid number (acid number approximately 90). After cooling to 180° C., the esterification components of the second stage, including toluhydroquinone, were added in the absence of air. Condensation was continued at 180° C. until, for an acid number of about 32, the viscosity corresponded to a flow-out time of 30 seconds (DIN 53 211), and thereafter at 165° C. until, for an acid number of about 29, the viscosity corresponded to a flow-out time of 40 seconds and then at 150° C. until, for an acid number of about 28, the viscosity corresponded to a flow-out time of 50 seconds. The reaction mixture was then cooled as quickly as possible to 100° C. and the polyester was dissolved in styrene to form a 65% solution.

B. Single-stage esterification process (Comparison Examples)

After all the esterification components, including toluhydroquinone, had been weighed in and after the air has been displayed by nitrogen, the mixture was quickly heated with stirring to 150° C., after which the temperature was kept at 150° C. for 1 hour and then increased to 180° C. at a rate of 10° C. per hour. From 180° C. downwards, the procedure was identical with that of the second stage of the two-stage esterification process. The polyester was dissolved in styrene to form a 65% solution.

Table 1

| Examples | 1 | 2 | 3 | 4 | |
|---|---|---|---|---|---|
| Procedure (number of stages) | 2 | 1 (Comparison) | 2 | 1 (Comparison) | |
| Maleic acid anhydride | 1862 | 1862 | — | — | g |
| Fumaric acid | — | — | 2204 | 2204 | g |
| Phthalic acid anhydride | 148 | 148 | 148 | 148 | g |
| Ethylene glycol | 1178 | 1240 | 1178 | 1265 | g |
| Ethylene glycol (2nd stage) | 62 | — | 87 | — | g |
| Trimethylol propane diallyl ether (2nd stage) | 1284 | 1284 | 1284 | 1284 | g |
| Toluhydroquinone (2nd stage) | 0.834 | 0.834 | 0.834 | 0.834 | g |

Table 1-continued

| Examples | 1 | 2 | 3 | 4 |
|---|---|---|---|---|
| Procedure (number of stages) | 2 | 1 (Comparison) | 2 | 1 (Comparison) |
| Characteristics of the polyester Example | 1 | 2 | 3 | 4 |
| Acid number (mg KOH/g) | 28 | 26 | 28 | 28 |
| OH-number (mg KOH/g) | 74 | 75 | 71 | 73 |
| Flow-out time (in seconds), 60% (DIN 53 211, DIN-4-cup) | 51 | 51 | 53 | 53 |

Lacquer films were produced as follows from the styrene solutions of the polyesters according to the invention:

Quantities of 8.35 g of the 65% polyester solutions in styrene were diluted with 1.65 g of styrene. 4% of a 50% cyclohexanone hydroperoxide and 1% of a 20% cobalt octoate solution (2.2% Co) in toluene were added to the solutions which were then coated onto glass plates in the form of 300μ thick layers using a film-drawing apparatus. The temperature at which the films were dried was 24° C.

The time taken by the surfaces of the films to become tack-free and also the pendulum hardnesses of the films (24 hours after coating) are shown in Table 2. They clearly demonstrate the advantages of the polyesters produced by the two-stage esterification process according to the present invention over the single-stage comparison polyesters.

Table 2

| Films of Example | 1 | 2 | 3 | 4 |
|---|---|---|---|---|
| Tack-free after (hours) | 7 | 8.5 | 7 | 8.5 |
| Pendulum hardness (seconds) | 92 | 74 | 108 | 91 |

We claim:

1. A process for producing an unsaturated polyester comprising the condensation product of (a) an α,β-ethylenically unsaturated dicarboxylic acid or an anhydride thereof, (b) a dihydric alcohol which is free from β,γ-ethylenically unsaturated ether groups and (c) an alcohol having at least one β,γ-ethylenically unsaturated ether group, said process comprising the steps of initially condensing a mixture consisting of (a) and (b) in the absence of oxygen at 140° to 220° C. to form a polyester precondensate with an acid number above 70 and a hydroxyl number below 40 and subsequently condensing said precondensate with (c) at 140° to 200° C., the amount of (c) utilized providing at least 0.1 mol of β,γ-ethylenically unsaturated ether groups per 100 g of unsaturated polyester.

2. The process of claim 1 wherein at least one member selected from the group consisting of (d) an aromatic, alicyclic or saturated aliphatic dicarboxylic acid or its anhydride, (e) a monocarboxylic acid and (f) a monohydric, trihydric or tetrahydric alcohol is condensed with (a) and (b) to form said polyester precondensate.

* * * * *